(12) United States Patent
Meunier et al.

(10) Patent No.: US 11,526,025 B2
(45) Date of Patent: Dec. 13, 2022

(54) EYEWEAR LENS FOR FRAMELESS EYEWEAR

(71) Applicant: Oakley, Inc., Foothill Ranch, CA (US)

(72) Inventors: Benjamin John Meunier, San Clemente, CA (US); Dugan O'Keene, Newport Beach, CA (US); Joon H. Kim, Hacienda Heights, CA (US); Nicolas Adolfo Garfias, Long Beach, CA (US); Ryan Neil Saylor, Mission Viejo, CA (US)

(73) Assignee: Oakley, Inc., Foothill Ranch, CA (US)

( * ) Notice: Subject to any disclaimer, the term of this patent is extended or adjusted under 35 U.S.C. 154(b) by 14 days.

(21) Appl. No.: 16/796,527

(22) Filed: Feb. 20, 2020

(65) Prior Publication Data

US 2020/0271950 A1    Aug. 27, 2020

Related U.S. Application Data

(60) Provisional application No. 62/809,267, filed on Feb. 22, 2019.

(51) Int. Cl.
 *G02C 1/02* (2006.01)
(52) U.S. Cl.
 CPC ..................... *G02C 1/02* (2013.01)
(58) Field of Classification Search
 CPC .......... G02C 1/02; G02C 1/023; G02C 1/026; G02C 1/04; G02C 1/06; G02C 1/10;
 (Continued)

(56) References Cited

U.S. PATENT DOCUMENTS

| 4,610,036 A | 9/1986 | LaPrairie |
| 5,469,229 A | 11/1995 | Greenbaum |

(Continued)

FOREIGN PATENT DOCUMENTS

| JP | S 60-133430 U | 9/1985 |
| JP | S 61-46523 U | 3/1986 |

(Continued)

OTHER PUBLICATIONS

International Search Report and Written Opinion dated Apr. 16, 2020 in related PCT Application No. PCT/US2020/019024; 10 pages.

(Continued)

*Primary Examiner* — William R Alexander
*Assistant Examiner* — Sharrief I Broome
(74) *Attorney, Agent, or Firm* — Sterne, Kessler, Goldstein & Fox P.L.L.C.

(57) ABSTRACT

Eyewear lenses for frameless eyewear may include a stiffening member configured to increase the stiffness of the eyewear lens. The stiffening member may be an integral part of the lens and extend along the upper portion of the lens. At least a portion of the stiffening member may extend forward of a corresponding point on the front surface of the lens. The stiffening member may have different dimensions and cross sections, based on, for example, the stiffening enhancement needed and aesthetic considerations. The stiffening member may be designed to improve the moment of inertia of the eyewear lens to a desired value when compared to an otherwise identical lens without a stiffening member. The increased stiffness caused by the stiffening member may also be designed to achieve a target head force on the head of a user when the eyewear lens is integrated into eyewear.

21 Claims, 6 Drawing Sheets

(58) Field of Classification Search
CPC ... G02C 3/00; G02C 5/00; G02C 7/00; G02C 9/00; G02C 11/00; G02C 13/00; G02C 2200/00; G02C 2202/00; G02C 1/00; G02C 7/04; G02C 11/10; G02C 7/02; G02C 7/06; G02C 2202/16; G02C 7/049; G02C 7/16; G02C 7/061; G02C 7/12; G02C 3/003; G02C 7/027; G02C 5/12; G02C 2200/02; G02C 7/083; G02C 2200/08; G02C 7/10; G02C 7/101; G02C 7/104; G02C 5/02; G02C 5/143; G02C 1/08; G02C 7/028; G02C 11/02; G02C 13/003; G02C 5/008; G02C 5/146; G02C 2202/20; G02C 5/22; G02C 5/20; G02C 7/022; G02C 13/005; G02C 9/04; G02C 7/041; G02C 7/102; G02C 5/2209; G02C 7/044; G02C 7/086; G02C 5/001; G02C 7/021; G02C 11/08; G02C 2202/22; G02C 5/14; G02C 7/048; G02C 7/047; G02C 7/042; G02C 7/105; G02C 7/024; G02C 7/108; G02C 11/06; G02C 13/001; G02C 7/085; G02C 5/126; G02C 5/006; G02C 5/10; G02C 11/04; G02C 5/16; G02C 2202/24; G02C 9/02; G02C 7/046; G02C 3/02; G02C 7/14; G02C 7/088; G02C 5/2254; G02C 5/2263; G02C 13/006; G02C 3/04; G02C 7/063; G02C 7/08; G02C 11/12; G02C 13/008; G02C 2200/16; G02C 7/066; G02C 2200/22; G02C 7/081; G02C 2200/10; G02C 5/08; G02C 5/122; G02C 7/065; G02C 2200/06; G02C 2200/04; G02C 2202/08; G02C 7/068; G02C 5/128; G02C 2200/12; G02C 2200/18; G02C 2200/26; G02C 2202/10; G02C 5/124; G02C 2202/06; G02C 3/006; G02C 5/2272; G02C 5/2227; G02C 7/107; G02C 5/06; G02C 5/18; G02C 2200/20; G02C 7/045; G02C 2202/18; G02C 5/2236; G02C 2202/12; G02C 5/045; G02C 7/043; G02C 5/04; G02C 7/025; G02C 2202/14; G02C 2200/30; G02C 7/165; G02C 5/2245; G02C 2202/04; G02C 5/2281; G02C 5/003; G02C 5/2218; G02C 2202/02; G02C 2200/28; G02C 2200/14; G02C 2200/24; G02C 5/005; G02C 2200/32; G02C 5/229
See application file for complete search history.

(56) References Cited

U.S. PATENT DOCUMENTS

| | | | | |
|---|---|---|---|---|
| 5,969,787 | A * | 10/1999 | Hall | A61F 9/025 351/110 |
| 2003/0058401 | A1* | 3/2003 | Preutz | G02C 5/143 351/86 |
| 2012/0019768 | A1* | 1/2012 | Maria Barlag | G02C 5/008 351/106 |
| 2013/0083285 | A1* | 4/2013 | McNeal | A61F 9/025 2/439 |
| 2014/0307222 | A1* | 10/2014 | Marini | G02C 5/146 351/114 |
| 2015/0205144 | A1* | 7/2015 | Chin | G02C 5/122 351/137 |
| 2015/0323807 | A1 | 11/2015 | Marini et al. | |
| 2017/0065019 | A1* | 3/2017 | Jenkins | G02C 3/02 |
| 2017/0068110 | A1* | 3/2017 | Ho | G02C 1/02 |
| 2020/0113738 | A1 | 4/2020 | Calilung et al. | |

FOREIGN PATENT DOCUMENTS

| | | |
|---|---|---|
| JP | H0 7-140423 A | 6/1995 |
| JP | 3021088 U | 2/1996 |
| JP | H 09-101485 A | 4/1997 |
| JP | 2015-508912 A | 3/2015 |
| JP | 2017-111185 A | 6/2017 |
| JP | 2019-500068 A | 1/2019 |
| WO | 2006106541 A1 | 10/2006 |

OTHER PUBLICATIONS

Notice of Reasons for Refusal in related Japanese Application No. 2021-549221, dated Oct. 4, 2022; 13 pages.

Search Report by related Japanese Application No. 2021-549221, dated Sep. 22, 2022; 28 pages.

* cited by examiner

EYEWEAR LENS FOR FRAMELESS EYEWEAR

CROSS REFERENCE TO RELATED APPLICATIONS AND INCORPORATION BY REFERENCE

This application claims the benefit of U.S. Provisional Patent Application No. 62/809,267, filed on Feb. 22, 2019, which is incorporated herein by reference in its entirety.

BACKGROUND

Frameless eyewear is a type of eyewear that does not include a full orbital frame element surrounding the eyewear lenses. This type of eyewear is often desirable for both practical reasons (e.g., the removal of the frame can increase the field of view through the lens or improve ventilation of the lens and reduce lens fogging) and aesthetic reasons (e.g., the resulting eyewear may have a more clean, minimalist look). With frameless eyewear, the eyewear lens provides some or all of the structural support needed for the eyewear to function properly because there is either less or no support provided by the frame. Structural properties of the eyewear lens, such as tensile strength, impact resistance, and stiffness, can be achieved in several ways. For example, the eyewear lens itself may simply be made uniformly thicker. This approach can achieve the desired physical properties, but also results in increased lens weight, potential aesthetic issues, and increased production costs.

BRIEF SUMMARY

Embodiments of the present disclosure include a frameless eyewear lens that includes a lens body having a front surface and a back surface and a stiffening member disposed on an upper portion of the lens body and extending along the upper portion of the lens body. The stiffening member is an integral part of the lens body. In an embodiment, at least a portion of the stiffening member extends forward of a corresponding point on the front surface.

In another embodiment, a moment of inertia of the eyewear lens with the stiffening member as measured about a vertical axis through a center of a rotated geometry of the lens is at least 2,200 mm$^4$ greater than the same moment of inertia taken of an identical frameless eyewear lens without the stiffening member.

In another embodiment, a thickness of the stiffening member is between 90% and 110% of a lens thickness at a midpoint of the lens, and a portion of the stiffening member has an extension distance measured from the back surface of at least twice that of the lens thickness.

DETAILED DESCRIPTION

Embodiments of the present invention(s) will now be described in detail in the accompanying drawings. References to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Frameless eyewear lenses may themselves provide the structural support that allows frameless eyewear to function properly. A frameless eyewear lens according to embodiments of the present invention possesses appropriate physical properties, such as tensile strength, impact resistance, and stiffness, while still maintaining good optical properties and a pleasing aesthetic appearance. Stiffness, in particular, is of significant concern when designing a frameless eyewear lens. In a typical frameless eyewear, the retaining force that holds the eyewear on the head of the user is applied to the frameless eyewear lens at the lateral or outboard ends of the lens. This can result in the frameless eyewear lens bowing outwards near the midpoint of the lens if it is not sufficiently stiff. A frameless eyewear lens should also be able to protect the eyes of a user in the case of an impact against the lens without needing the additional support provided by an eyewear frame.

One possible solution to this problem is to make the frameless eyewear lens thicker. However, this results in a heavier lens, aesthetic issues, and increased manufacturing cost.

An embodiment of the present disclosure is a frameless eyewear lens that includes a lens body having a front surface and a back surface and a stiffening member located on an upper portion of the lens body such that the stiffening member extends along the upper portion of the front portion. The stiffening member is an integral part of the front portion, and a portion of the stiffening member extends forward of a corresponding point on the front surface of the lens.

Advantages of this and other embodiments include, for example, sufficient lens stiffness without requiring an excessively thick eyewear lens. As discussed below, the stiffening member may also enhance the airflow across the back surface of the frameless eyewear lens as compared to that of a similar lens without the stiffening member, and provide an enhanced aesthetic appeal to the lens.

Figure 1:
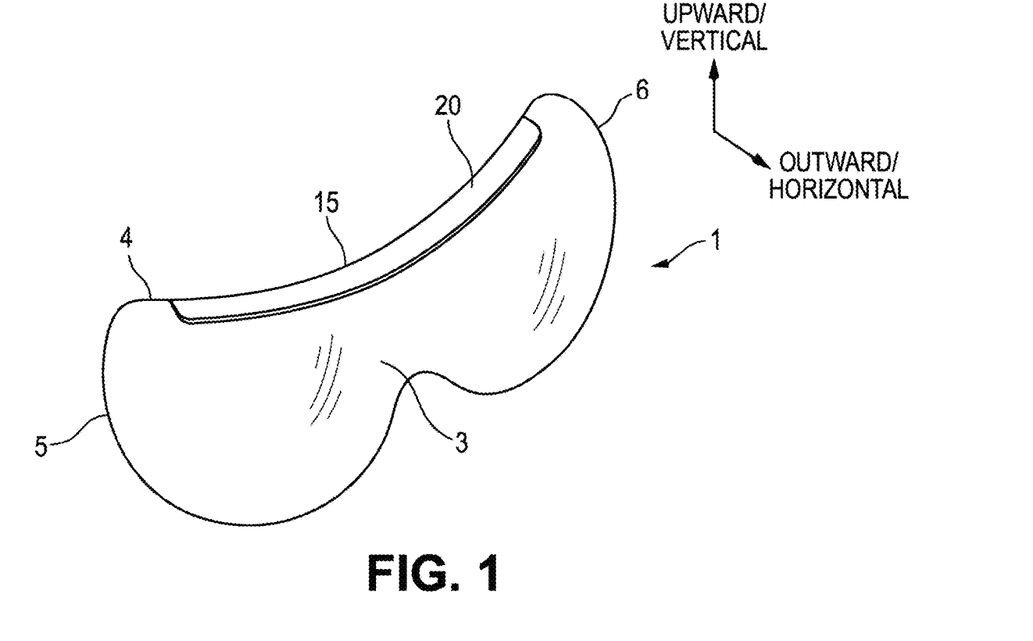
FIG. 1 is a perspective view of a frameless eyewear lens according to embodiments.

A lens 1 for a frameless eyewear according to embodiments is shown in FIG. 1, which shows a perspective view of lens 1 in isolation. As shown in FIG. 1, embodiments of lens 1 may include a lens body 3. A first end 5 and a second end 6 are located on the outboard ends of lens 1. A stiffening member 20 is also shown on an upper portion 4 of lens 1. Stiffening member 20 is configured to increase the stiffness of lens 1 as compared to an identical eyewear lens without stiffening member 20. Stiffening member 20 will be described in further detail below.

Figure 2:
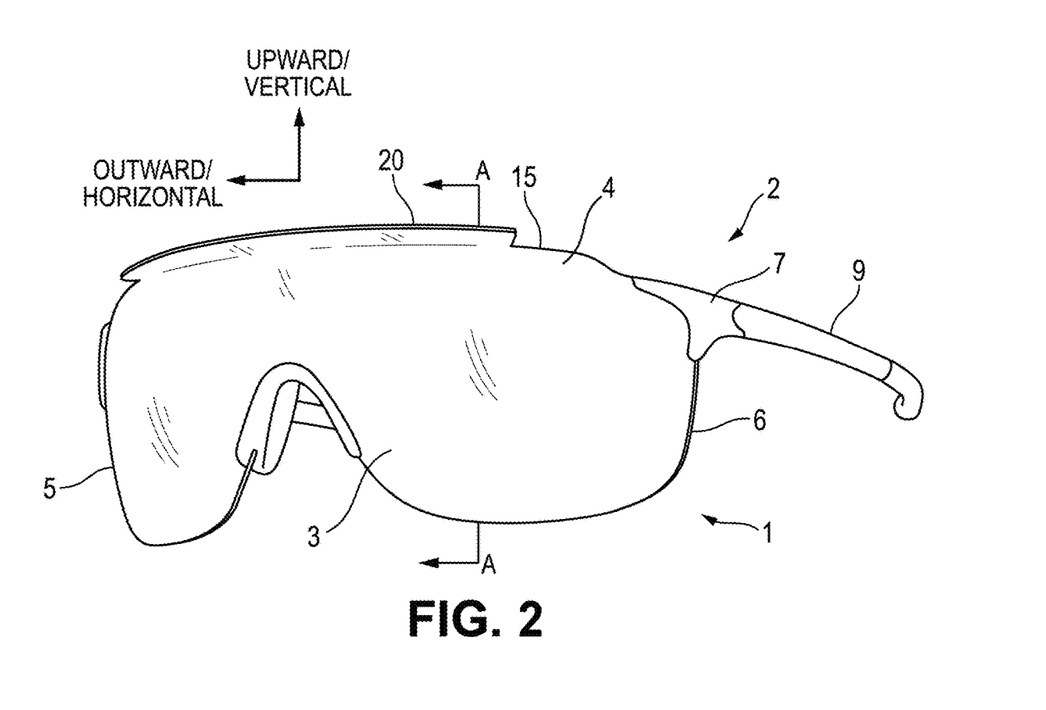
FIG. 2 is a perspective view of a frameless eyewear lens as part of an eyewear according to embodiments.

The term "frameless" is defined as a type of eyewear that does not include an eyewear frame or orbital that substantially surrounds lens 1, and in particular an eyewear frame that does not extend across the top or brow portion of lens 1. Rather, the orbital of a frameless lens may be only partial (see, e.g., FIG. 3), or may be completely absent such that the lens is held in place with respect to a wearer only by earstems. (See, e.g., FIG. 2.) For example, embodiments of lens 1 as shown in FIG. 2 may be adapted to function with eyeglass-type frameless eyewear. For example, FIG. 2 shows an embodiment of lens 1 that is incorporated into an eyeglass-type frameless eyewear 2. As shown in FIG. 2, a pair of temples 9 (also referred to as earstems) are attached, respectively, to first end 5 and second end 6 at attachment portions 7. In some embodiments, attachment portions 7 are not needed, and each of the pair of temples 9 attaches directly to lens 1 at first end 5 and second end 6, respectively. As is known, temples 9 can be placed over the ears of an end user to retain frameless eyewear 2 on the head of a wearer. Embodiments of lens 1 similar to those described here may also be adapted to function in embodiments of frameless eyewear 2 that have two separate lenses 1 (one lens for each eye) separated by a nose piece. In these embodiments, each lens 1 has its own stiffening member 20. The functionality of the dual-lens embodiments is otherwise identical to frameless eyewear 2 as shown in FIG. 2.

Figure 3:
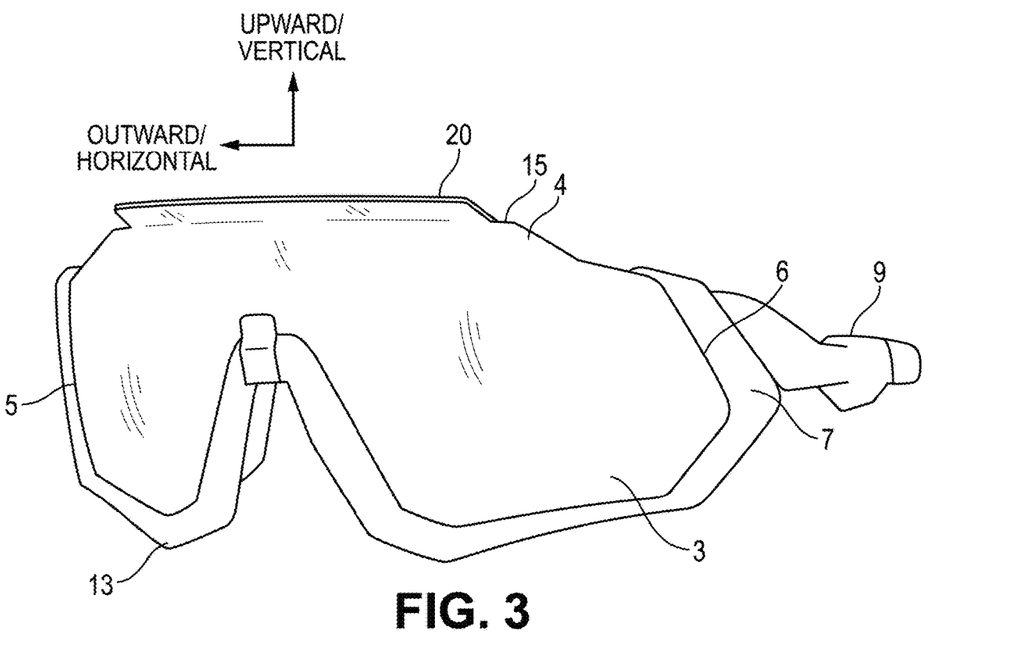
FIG. 3 is a perspective view of a frameless eyewear lens as part of an eyewear according to embodiments.

A further embodiment of lens 1 is shown, for example, in FIG. 3. Embodiments of frameless eyewear 2 as shown in FIG. 3 include a partial eyewear frame 13 (also referred to as a partial orbital or partial orbital frame) extending along a lower portion of lens 1 from first end 5 to second end 6. Temples 9 are attached to eyewear frame 13 near first end 5 and second end 6 of lens 1. As shown in FIG. 3, stiffening member 20 may run across upper portion 4 of lens 1, approximately opposite the location of eyewear frame 13 along the lower portion of lens 1.

Figure 4:
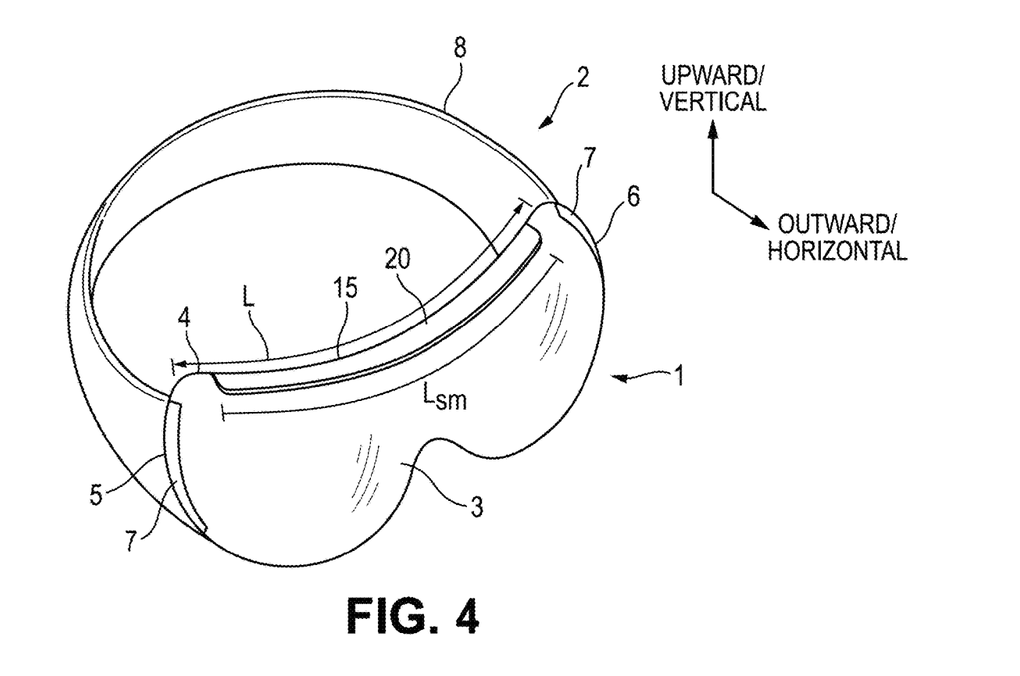
FIG. 4 is a perspective view of a frameless eyewear lens as part of an eyewear according to embodiments.

Other embodiments of lens 1 may be adapted to function with goggle-type frameless eyewear. FIG. 4 shows an example of how embodiments of lens 1 may be incorporated into a frameless eyewear 2. In FIG. 4, goggle-type frameless eyewear 2 is shown, with a strap 8 being attached to lens 1 at attachment portions 7 located at first end 5 and second end 6 to form a loop that is configured to encircle the head of a user. Attachment portions 7 may be integral with lens 1, or may be separate elements that are attached to first and second ends 5 and 6 of lens 1, as shown in FIG. 4. As shown in FIG. 4, attachment portions 7 do not extend completely around the perimeter of lens 1, and are absent across the top or brow portion of lens 1, and thus FIG. 4 illustrates an example of a frameless eyewear within the scope of the present disclosure.

The embodiments of frameless eyewear 2 shown in FIGS. 2-4 are only some examples of possible types of eyewear that lens 1 may be used in. By way of example and not limitation, lens 1 can be incorporated into various types of eyewear, including, but not limited to, general-purpose eyewear, special-purpose eyewear, sunglasses, driving glasses, sporting glasses, goggles, visors, shields, indoor eyewear, outdoor eyewear, vision-correcting eyewear, contrast-enhancing eyewear, eyewear designed for another purpose (for example, helmet visors), or eyewear designed for a combination of purposes.

Stiffening member 20 provides structural stiffening to lens 1. Stiffening member 20 is an integral part of lens 1. Thus, stiffening member 20 forms a single, monolithic part with lens 1, and can be made of the same material as lens 1. In some embodiments, there is a seamless transition between stiffening member 20 and upper portion 4 of lens 1, with no detectable structural change in the material of lens 1 when moving from lens body 3 to stiffening member 20. In some embodiments, stiffening member 20 may be configured to transmit light with minimal optical distortions. For example, stiffening member 20 may be made from a transparent or translucent material similar to that of lens body 3 and may also include a smooth transition between stiffening member 20 and lens body 3 that minimizes optical distortion of light passing through stiffening member 20.

In embodiments, stiffening member 20 may extend fully or partially along upper portion 4 of lens 1 as shown in FIGS. 1 and 2. Upper portion 4 includes a top edge 15 of lens 1. Upper portion 4 may extend downwards from top edge 15 of lens 1 a certain distance across lens 1. In some embodiments, upper portion 4 may extend downwards between 5 and 15 mm from top edge 15. In some embodiments, upper portion 4 may extend downwards from top edge 15 to an upper edge of the field of view of a wearer. In embodiments, stiffening member 20 is located at the top of upper portion 4 (i.e. along top edge 15). In other embodiments, however, stiffening member 20 may also be located within upper portion 4 at some distance below top edge 15.

As shown, for example, in FIG. 4, a length L is defined as the total length of top edge 15. Length L is also known as the chord length or arc length of lens body 3. Also as shown in FIG. 4, the total length that stiffening member 20 extends along upper portion 4 is defined as length $L_{sm}$. $L_{sm}$ may be expressed as a percentage of length L. Embodiments of stiffening member 20 may extend along upper portion 4 to any desired extent. For example, embodiments of stiffening member 20 may extend along 40%-60% of length L. Other embodiments of stiffening member 20 may extend along 60%-80% of length L. Other embodiments of stiffening member 20 may extend along 80%-100% of length L. Other embodiments of stiffening member 20 may extend along 50%-90% of length L. Other embodiments of stiffening member 20 may extend along approximately 100% of length L of top edge 15. Other embodiments of stiffening member 20 may extend along at least 50%, 60%, 70%, 80%, or 90% of length L of top edge 15. Generally, embodiments of stiffening member 20 that extend along a greater percentage of upper portion 4 than others will result in a stiffer lens 1. In FIG. 1, stiffening member 20 is illustrated as being centered on upper portion 4, which is to say stiffening member 20 extends an equal distance towards first end 5 and second end 6 relative to a midpoint of lens 1. However, stiffening member 20 does not necessarily need to be centered, and could extend further to one side of lens 1 than to the other side.

Figure 5:
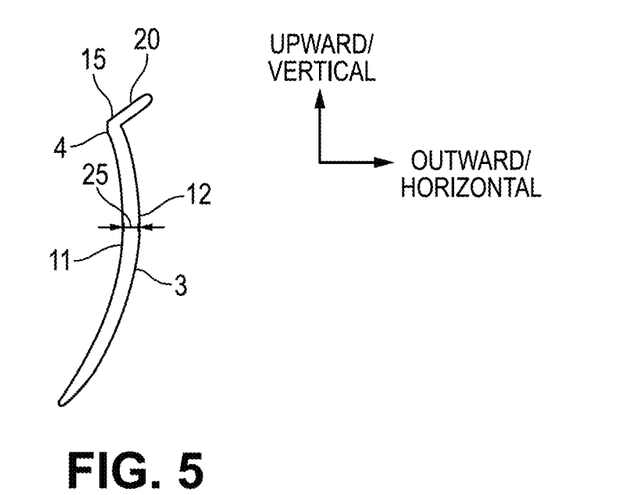
FIG. 5 is a cross section of a frameless eyewear lens according to embodiments.

FIG. 5 shows a cross section of an embodiment of frameless eyewear lens. As shown in FIG. 5, lens body 3 has a back surface 11 and a front surface 12. The cross section of FIG. 5 is taken along line A-A as shown in FIG. 2. The cross section is oriented to position top edge 15 of lens 1 at the top of the cross section (i.e. lens 1 is oriented as it would be positioned on the head of a wearer standing upright). Lens body 3 is configured to transmit light. In embodiments, lens body 3 may be tinted in any desirable shade, or may have no tint (e.g., lens body 3 may be clear). Stiffening member 20 is visible at the top of the cross section of FIG. 5, in upper portion 4 of lens 1. As shown in FIG. 5, embodiments of stiffening member 20 are located entirely forward, that is anteriorly or outward, of a back surface 11. This relationship may be true for any cross section of stiffening member 20 taken in the same manner as described for the cross section of FIG. 5. Thus, embodiments of stiffening member 20 as shown, for example, in FIG. 5 are located in front of lens 1. As shown in FIG. 5, stiffening member 20 may extend upward at an angle with respect to a horizontal plane. For example, stiffening member 20 may be angled upwards at an approximate angle of 45 degrees with respect to the horizontal plane. In another example, stiffening member 20 may be angled upwards at an angle between 30 and 70 degrees with respect to the horizontal plane. Other Embodiments of stiffening member 20 as shown in FIG. 5 may be angled such that stiffening member 20 extends at some other angle above or below the horizontal, or stiffening member 20 may extend outwards approximately parallel to the horizontal plane.

Figure 6:
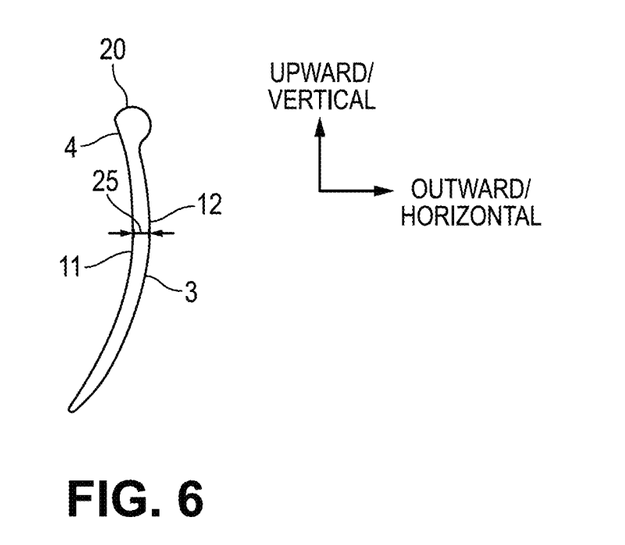
FIG. 6 is a cross section of a frameless eyewear lens according to embodiments.
Figure 7:
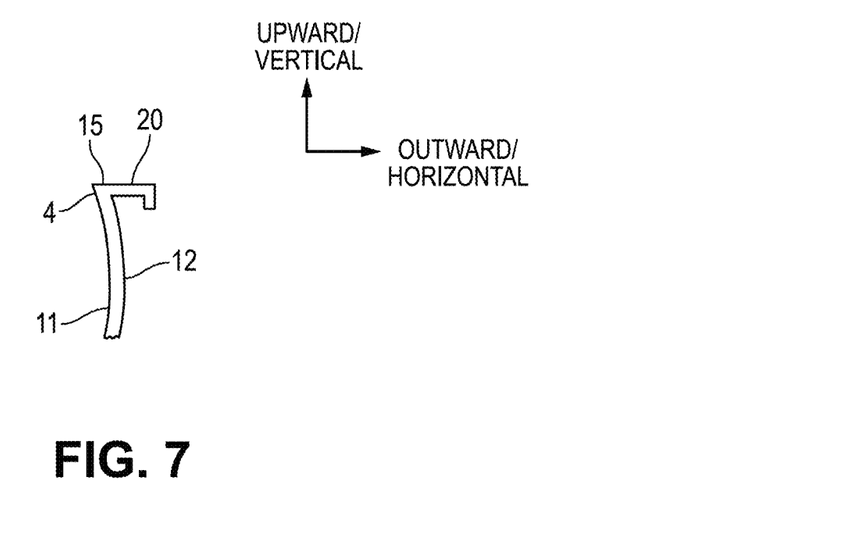
FIG. 7 is a portion of a cross section of a frameless eyewear lens according to embodiments.
Figure 8:
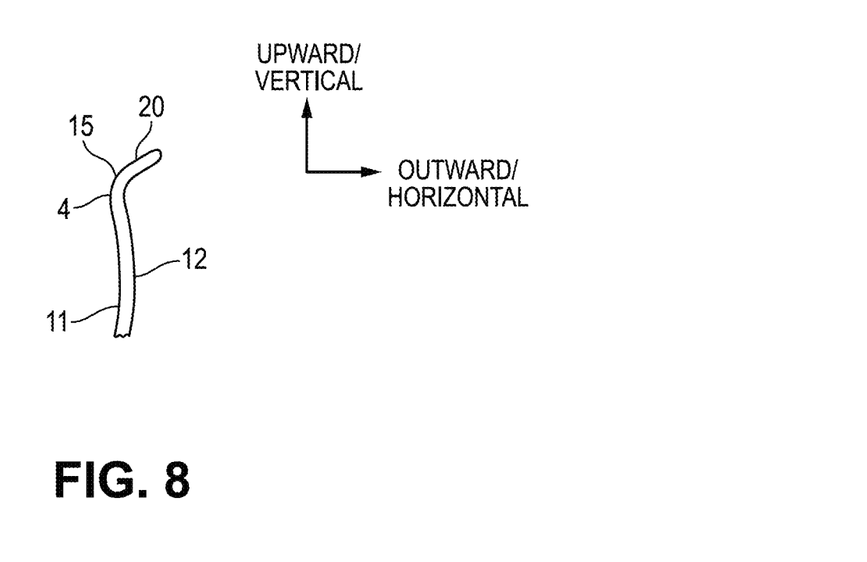
FIG. 8 is a portion of a cross section of a frameless eyewear lens according to embodiments.
Figure 9:
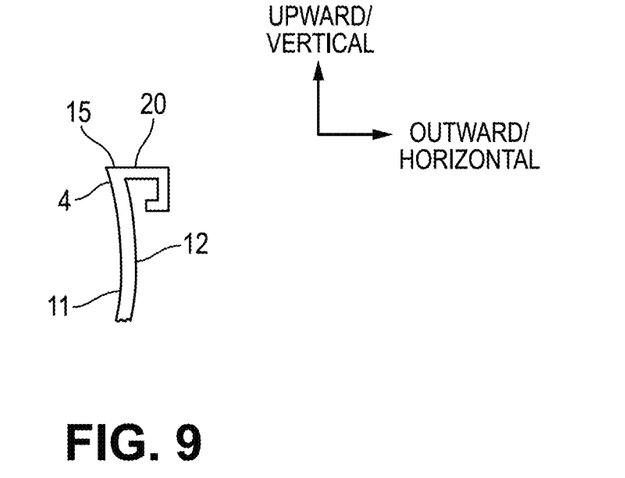
FIG. 9 is a portion of a cross section of a frameless eyewear lens according to embodiments.

Embodiments of stiffening member 20 as illustrated in FIG. 5 may include planar members that extend approximately outward from upper portion 4, relative to the location of the wearer. However, stiffening member 20 may be formed in various other shapes. For example, FIG. 6 shows a cross section view of lens 1 that is taken using the same method described in FIG. 5. In FIG. 6, stiffening member 20 is illustrated as a rounded "bead" disposed on upper portion 4 of lens 1. Embodiments of stiffening member 20 may also be formed in other shapes, as shown in FIGS. 7-9. FIGS. 7-9 show a portion of a cross sections similar to those of FIGS. 5-6. FIGS. 7-9 illustrate different possible geometries of stiffening member 20. For example, FIG. 7 shows an embodiment of stiffening member 20 that may be formed in an "L" shape with a vertically downward facing flange added to the end of stiffening member 20. Other possible embodiments of stiffening member may have curved (FIG. 8) or "u" shaped (FIG. 9) cross sections. The interface between the stiffening member and the upper portion of the lens may be angled (as shown in FIG. 5, for example) or curved (for example, FIG. 8). The specific shape of stiffening member 20 may be modified to any desirable shape to improve stiffening and/or aesthetic appearance.

Figure 10:
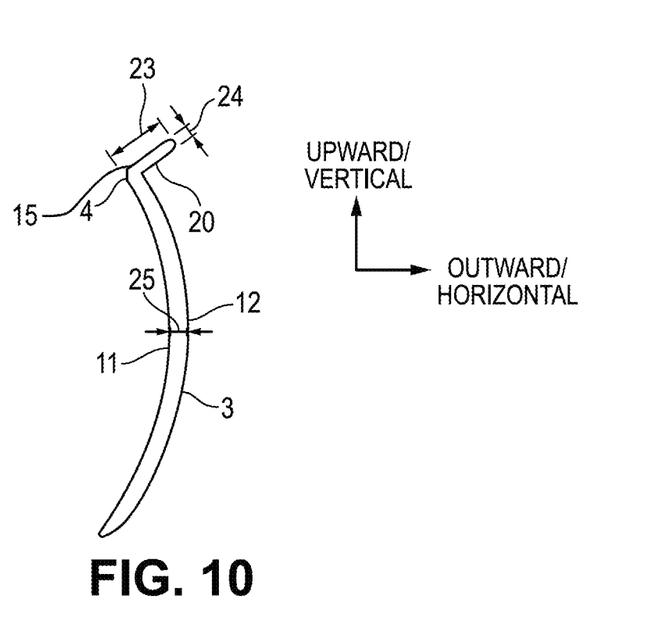
FIG. 10 is a cross section of a frameless eyewear lens showing additional physical parameters according to embodiments.

The dimensions of stiffening member 20 may be varied according to the specifics of lens 1, the desired stiffness of lens 1, aesthetic considerations, and/or other well-known design factors. FIG. 10 is a cross section view of the lens 1 of FIG. 2. As shown in FIG. 10, embodiments of stiffening member 20 can have an extension distance 23 and a thickness 24. As shown in FIG. 10, extension distance 23 is defined as the distance traveled by stiffening member 20 relative to back surface 11. Depending on the orientation of stiffening member 20, extension distance 23 may or may not be the horizontal distance stiffening member 20 extends outwards from back surface 11. For example, as shown in FIG. 10, extension distance 23 may be at an angle with respect to the horizontal. Thickness 24 is defined as the maximum thickness of stiffening member 20 in a local perpendicular direction, which is a direction perpendicular to at least one of the surfaces of stiffening member 20. These dimensions do not need to change if the angle of stiffening member 20 were changed, i.e. if stiffening member 20 in FIG. 10 was approximately parallel with the horizontal.

It is convenient to define the dimensions of stiffening member 20 in terms of a midpoint thickness 25 of lens 1. In embodiments, midpoint thickness 25 may be between approximately 0.025 inches (0.64 mm) and approximately 0.125 inches (3.175 mm), for example. In embodiments, midpoint thickness 25 may be between approximately 0.040 inches (1.00 mm) and approximately 0.09 inches (2.3 mm), for example. In embodiments, midpoint thickness 25 may be between approximately 0.040 inches (1.00 mm) and approximately 0.0625 inches (1.6 mm), for example. Embodiments of stiffening member 20 may have extension distance 23 of between, for example, approximately two to four times midpoint thickness 25. For example, extension distance 23 may be 2, 2.5, 3, 3.5, or 4 times midpoint thickness 25. For example, extension distance 23 may be between approximately 0.20 inches (5 mm) and approximately 0.40 inches (10 mm). Embodiments of stiffening member 20 may have a thickness 24 of between approximately 0.5 and 1.5 times midpoint thickness 25. For example, thickness 24 may be between approximately 0.020 inches (0.51 mm) and approximately 0.060 inches (1.52 mm), given a midpoint thickness 25 of 0.40 inches (1.00 mm). For example, thickness 24 may be between approximately 0.7 and 1.3 times midpoint thickness 25. In a further embodiment, thickness 24 may be between 95% and 105% of midpoint thickness 25. It should be understood that these dimensions are examples, and they can be modified as desired to accommodate the specific design of lens 1. Also, different embodiments of stiffening member 20 may have different or additional dimensions depending on the shape or size of stiffening member 20.

Changing the dimensions described above has an effect on the stiffening properties provided by stiffening member 20. For example and in general, when the value of length L is larger, and thus stiffening member 20 extends farther along top portion 4 of lens body 3, extension distance 23 and thickness 24 may be made smaller to achieve a given increase in stiffness of lens body 3. The stiffness provided by stiffening member 20 is a function of extension distance 23, thickness 24, and length $L_{sm}$, and when thickness 24 is constant, embodiments of stiffening member 20 that have a relatively longer length $L_{sm}$ can have a relatively shorter extension distance 23, or vice versa, to maintain a given stiffness. Therefore, for example, in a case where more stiffness is desired, stiffening member 20 may be made to have a longer length $L_{sm}$, a longer extension distance 23, a greater thickness 24, or any combination of these three modifications as needed based on the specific design objectives of lens 1.

As discussed above, stiffening member 20 is configured to increase the stiffness of lens 1. A useful property when discussing stiffness of a physical body is the moment of inertia of a plane area of the body ("moment of inertia"), which describes the body's resistance to bending. Generally, a larger moment of inertia indicates a greater resistance to bending—i.e., a "stiffer" physical body. Thus, modifying the dimensions of stiffening member 20 as described above to increase the stiffness of lens 1 would result in a larger moment of inertia. A larger moment of inertia would also generally result in a larger head force (discussed further below).

Figure 11:
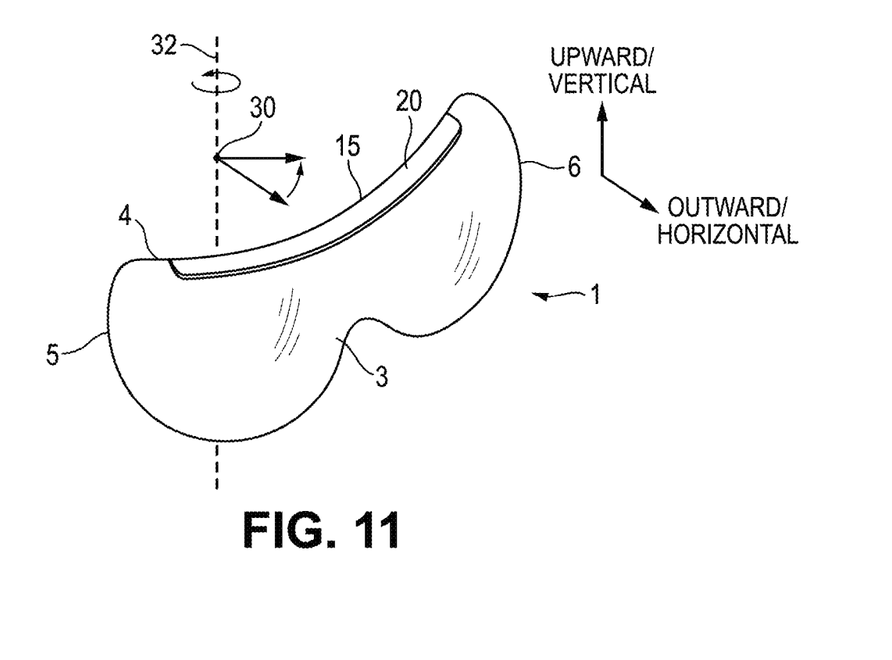
FIG. 11 is a perspective view of a frameless eyewear lens showing additional physical parameters according to embodiments.

The moment of inertia is typically calculated with reference to a desired reference axis. FIG. 11 shows a perspective view of embodiments of lens 1 similar to that of FIG. 1. FIG. 11 shows a reference point 30 that may be the center of rotation of a rotated body comprising lens 1. Reference axis 32 is a vertical axis through reference point 30. Using reference axis 32, the moment of inertia of lens 1 may be calculated. Calculating the moment of inertia of a physical body is well-known in the art and will not be described in detail here. Stiffening member 20 may increase the moment of inertia of lens 1 as compared to an identical lens 1 that does not have a stiffening member 20—that is, a lens that shares all the same features as lens 1, but does not include lens 1's stiffening member. The increase in stiffening may be any desired amount. For example, in embodiments stiffening member 20 may increase the moment of inertia of lens 1 by approximately 2,200 mm$^4$ as compared to an otherwise identical lens without a stiffening member. In another example, in embodiments stiffening member 20 may increase the moment of inertia of lens 1 by approximately 2,500 mm$^4$ as compared to an otherwise identical lens without a stiffening member. In another example, in embodiments stiffening member 20 may increase the moment of inertia of lens 1 by approximately 2,800 mm$^4$ as compared to an otherwise identical lens without a stiffening member. In another example, in embodiments stiffening member 20 may increase the moment of inertia of lens 1 by approximately 3,000 mm$^4$ as compared to an otherwise identical lens without a stiffening member. In embodiments, the moment of inertia of lens 1 with stiffening member 20 may be approximately 300 mm$^4$, 600 mm$^4$, 800 mm$^4$, or 1000 mm$^4$ more than an otherwise identical lens 1 without a stiffening member.

Figure 12:
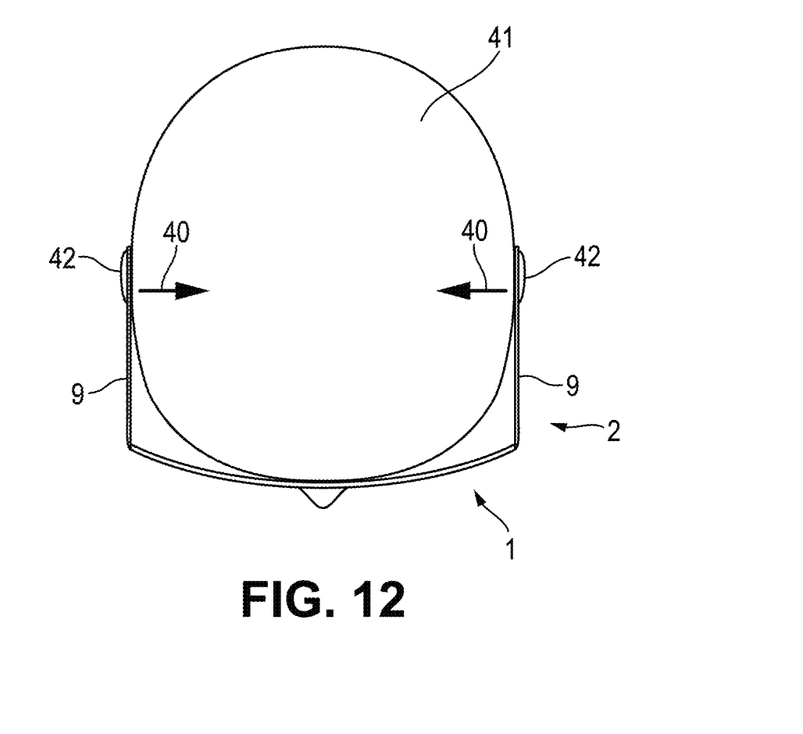
FIG. 12 is a top view of a frameless eyewear on the head of a user showing additional physical parameters according to embodiments.

In general, eyewear is used by placing the eyewear on the head of a user. As discussed above, this placement may be accomplished by various structures, including strap 8 or temples 9, as shown in FIGS. 3 and 2, respectively, discussed above. FIG. 12 shows a top view of a frameless eyewear 2 with temples 9 on a head 41 of a user. Temples 9 are visible on either side of head 41, and as shown are placed on and/or behind ears 42 of the user. The type of frameless eyewear 2 that uses temples 9 is generally designed such that in a relaxed state, the distance between each of temples 9 is less than the typical distance between ears 42 of a head 41 of a user. This means that temples 9 will be forced to flex outward slightly with respect to each other when placed on head 41. This results in enhanced retention of frameless eyewear 2 on head 41 of the user. The flexing of temples 9 causes lens 1 to bend outwards.

The force that temples 9 exerts on head 41 due to the tendency of the temples 9 to return to a neutral state after flexing is a measurable property called "head force" that is relevant to eyewear having temples 9. Head force 40 is thus directly related to the total distance that temples 9 need to flex apart and the stiffness of lens 1. As shown in FIG. 12, a head force 40 generated by temples 9 is directed perpendicularly inward with respect to head 41 by temples 9. Because a frame usually provides structural support to a lens, eyewear having a lens in a frameless configuration tends to be more flexible than eyewear having that same lens in a framed configuration. Stiffening member 20 can therefore be designed to create a desired head force 40 in a given frameless eyewear 2 for a known size of head 41. A range of different head force values may be desirable depending on the design objectives of eyewear. For example, in embodiments head force 40 may be between approximately 0.20 lbf (0.89 N) and approximately 0.25 lbf (1.11 N) for a standard sized head 41. In some embodiments head force 40 may be between approximately 0.15 lbf (0.67 N) and approximately 0.35 lbf (1.56 N). In some embodiments head force 40 may be between approximately 0.10 lbf (0.44 N) and approximately 0.40 lbf (1.78 N). Generally, higher head force 40 provides greater retention but may be less comfortable. Thus, higher head force 40 is typically targeted for eyewear that will be used in athletic activities that involve significant movement by the user (e.g. running, biking, tennis, etc.). Head force 40 also depends on the size of the head in question because a larger head will result in more deflection of eyewear. Thus, in embodiments, for example, a standard size head 41 may have a distance between ears 42 of approximately 6.10 inches (155 mm). Accordingly, stiffening member 20 may be designed to stiffen frameless eyewear 2 such that head force 40 is between approximately 0.20 lbf (0.89 N) and approximately 0.25 lbf (1.11 N). For example, in some embodiments lens 1 with head force 40 of approximately 0.20 lbf (0.89 N), stiffening member 20 may have a thickness 24 that is approximately equal to midpoint thickness 25 (e.g. 0.060 inches), extension distance 23 of approximately 5 mm, and length $L_{sm}$ of approximately 148 mm (which is approximately 100% of the total arc length L of lens 1). These embodiments of stiffening member 20 may result in an increase in moment of inertia of approximately 2500 mm$^4$ as compared to an otherwise identical lens 1 without stiffening member 20. In other embodiments with the same head force 40 of approximately 0.20 lbf and same total arc length L of lens 1, stiffening member 20 may have a thickness 24 that is that is approximately equal to midpoint thickness 25 (e.g. 0.060 inches), extension distance 23 of approximately 10 mm, and length $L_{sm}$ of approximately 125 mm (which is approximately 84% of the total arc length L of lens 1). These embodiments of stiffening member 20 may result in an increase in moment of inertia of approximately 3100 mm$^4$. In other embodiments, lens 1 has a total arc length L of approximately 198 mm and a head force 40 of approximately 0.35 lbf, while stiffening member 20 may have a thickness 24 that is approximately equal to midpoint thickness 25 (e.g. approximately 2 mm), extension distance 23 of approximately three times midpoint thickness 25 (e.g. approximately 6 mm), and length $L_{sm}$ of approximately 122 mm (approximately 62% of total arc length L of lens 1). These embodiments of stiffening member 20 may result in an increase in moment of inertia of approximately 6300 mm$^4$ as compared to an otherwise identical lens 1 without stiffening member 20. These examples are exemplary and other possible combinations of the dimensions of stiffening member 20 may result in the same or different values of head force 40. The value of head force 40 may also be increased or decreased as desired depending on the specific design goals of frameless eyewear 2.

In embodiments, stiffening member 20 may be configured to improve the airflow over back surface 11 of lens 1 as compared to an otherwise identical embodiment of lens 1 that includes a complete eyewear frame 13 instead of a stiffening member 20, and in particular an eyewear frame 13 that extends across the upper or brow portion of lens 1. For example, the forward, or anterior or outward, facing embodiments of stiffening member 20 result in a gap between the face of the user and eyewear that improves ventilation of lens body 3. Such improvement may be particularly noticeable for embodiments of stiffening member 20 that feature a significant extension outwards from front surface 12, as shown, for example, in FIG. 5. This is because the outwards-extending embodiments of stiffening member 20 act as a funnel or scoop to better channel air across back surface 11.

Lens 1 may be made from any suitable lens material known in the art. For example, glass and/or plastics, such as, for example, acrylics, nylons, or polycarbonates, may be used in lens 1. Frameless eyewear lens 1 may be made using any suitable method known in the art. For example, lens 1 may be cast, molded, or thermoformed. In embodiments, stiffening member 20 may be formed simultaneously with and/or during the same process as lens 1, or may be added in a chemical bonding process that integrates stiffening member 20 with lens 1 such that no seam can be detected.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A frameless eyewear lens, comprising:
   a lens body having a front surface and a back surface; and
   a stiffening member disposed on an upper portion of the lens body and extending along the upper portion of the lens body,
   wherein the stiffening member is an integral and monolithic part of the lens body, and
   wherein a portion of the stiffening member extends forward of a corresponding point on the front surface.

2. The frameless eyewear lens of claim 1, wherein any vertically-oriented perpendicular cross section of the stiffening member is forward of the corresponding back surface in the cross section.

3. The frameless eyewear lens of claim 1, wherein the lens with the stiffening member is configured to have enhanced airflow across the back surface of the lens as compared to an identical lens with at least an eyewear frame along a brow portion of the eyewear.

4. The frameless eyewear lens of claim 1, wherein a moment of inertia of the eyewear lens with the stiffening member as measured about a vertical axis through a center of a rotated geometry of the lens is at least 2,200 mm$^4$ greater than the same moment of inertia of an otherwise identical frameless eyewear lens without the stiffening member.

5. A frameless eyewear, comprising
   the frameless eyewear lens of claim 1, and
   first and second temples attached to a first end and a second end of the lens, respectively, and configured to retain the lens on the head of a user.

6. A frameless eyewear lens, comprising:
   a lens body having a front surface and a back surface; and
   a stiffening member disposed on an upper portion of the lens body and extending along the upper portion of the lens body,
   wherein the stiffening member is an integral part of the lens body, and
   wherein a moment of inertia of the eyewear lens with the stiffening member as measured about a vertical axis through a center of a rotated geometry of the lens is at least 2,200 mm$^4$ greater than the same moment of inertia of an identical frameless eyewear lens without the stiffening member.

7. The frameless eyewear lens of claim 6, wherein any vertically-oriented perpendicular cross section of the stiffening member is forward of the corresponding back surface in the cross section.

8. The frameless eyewear lens of claim 6, wherein the lens with the stiffening member has an enhanced airflow across the back surface of the lens as compared to an identical lens with an eyewear frame extending across the upper portion.

9. The frameless eyewear lens of claim 6, wherein the eyewear lens is made from at least one of a nylon and a polycarbonate.

10. The frameless eyewear lens of claim 6,
    wherein a portion of the stiffening member has an extension distance between two and four times a horizontal lens center thickness, and
    wherein a thickness of the stiffening member is between 95% and 105% of a lens midpoint thickness.

11. The frameless eyewear lens of claim 10, wherein the extension distance is approximately 5 mm.

12. A frameless eyewear, comprising:
    the frameless eyewear lens of claim 6, and
    first and second temples attached to a first end and a second end of the lens, respectively, and configured to retain the lens on the head of a user.

13. The frameless eyewear of claim 12,
    wherein the stiffening member extends along at least 60% of the total length of the upper portion of the lens,
    wherein the stiffening member has an extension distance of approximately 6 mm, and
    wherein the stiffening member has a thickness that is approximately equal to a midpoint thickness of the lens.

14. The frameless eyewear of claim 13, wherein the temple pieces create a head force of at least 0.200 lbf on the head of the user when worn by the user.

15. A frameless eyewear lens, comprising:
    a lens body having a front surface and a back surface; and
    a stiffening member disposed on an upper portion of the lens body and extending along the upper portion of the lens body,
    wherein a thickness of the stiffening member is between 90% and 110% of a lens thickness at a midpoint of the lens, and
    wherein a portion of the stiffening member has an extension distance measured from the back surface of at least twice that of the lens thickness.

16. The frameless eyewear lens of claim 15, wherein any vertically-oriented perpendicular cross section of the stiffening member is forward of the corresponding back surface in the cross section.

17. The frameless eyewear lens of claim 15, wherein the stiffening member extends across at least 60% of an arc length of the upper portion.

18. The frameless eyewear lens of claim 15, wherein a moment of inertia of the eyewear lens with the stiffening member as measured about a vertical axis through a center of a rotated geometry of the lens is at least 2,200 mm$^4$ greater than the same moment of inertia taken of an identical frameless eyewear lens without the stiffening member.

19. The frameless eyewear lens of claim 17, wherein the extension distance is at least 5 mm.

20. A frameless eyewear, comprising
    the frameless eyewear lens of claim 15, and
    first and second temples attached to a first end and a second end of the lens, respectively, and configured to retain the lens on the head of a user.

21. The frameless eyewear of claim 20, wherein the temples create a head force of at least 0.200 lbf on the head of the user when worn by the user.

\* \* \* \* \*